United States Patent
Smith

(10) Patent No.: US 12,314,718 B2
(45) Date of Patent: May 27, 2025

(54) STALLING ISSUE QUEUE ENTRIES UNTIL CONSECUTIVE ALLOCATED ENTRIES ARE AVAILABLE FOR SEGMENTED STORES

(71) Applicant: SiFive, Inc., San Mateo, CA (US)

(72) Inventor: Josh Smith, San Francisco, CA (US)

(73) Assignee: SiFive, Inc., Santa Clara, CA (US)

( * ) Notice: Subject to any disclaimer, the term of this patent is extended or adjusted under 35 U.S.C. 154(b) by 146 days.

(21) Appl. No.: 18/115,971

(22) Filed: Mar. 1, 2023

(65) Prior Publication Data

US 2024/0184582 A1  Jun. 6, 2024

Related U.S. Application Data

(60) Provisional application No. 63/429,702, filed on Dec. 2, 2022.

(51) Int. Cl.
*G06F 9/30* (2018.01)
*G06F 9/38* (2018.01)

(52) U.S. Cl.
CPC ........ *G06F 9/3005* (2013.01); *G06F 9/30036* (2013.01); *G06F 9/3814* (2013.01)

(58) Field of Classification Search
CPC .. G06F 9/3005; G06F 9/30036; G06F 9/3814; G06F 9/3826
See application file for complete search history.

(56) References Cited

U.S. PATENT DOCUMENTS

| | | | |
|---|---|---|---|
| 5,627,984 A * | 5/1997 | Gupta | G06F 9/3836 |
| | | | 712/E9.049 |
| 11,303,438 B2 * | 4/2022 | Gulley | G06F 9/30036 |
| 2008/0133883 A1 * | 6/2008 | Glew | G06F 9/3891 |
| | | | 712/E9.004 |

* cited by examiner

*Primary Examiner* — Farley Abad
(74) *Attorney, Agent, or Firm* — Kilpatrick Townsend & Stockton LLP

(57) ABSTRACT

A method for performing segmented vector store operations is disclosed. The method includes decoding one or more segmented vector store micro-operations (uops) of segmented vector store instruction in a pipeline, allocating, based on each of the one or more segmented vector store uops, one or more respective store buffer entries in First-in, First-out (FIFO) order, stalling the pipeline until store buffer entries are allocated by all of segmented vector store uops of the segmented vector store instruction, and writing, based on each of the one or more segmented vector store uops, manipulated vector data into multiple store buffer entries.

17 Claims, 6 Drawing Sheets

STALLING ISSUE QUEUE ENTRIES UNTIL CONSECUTIVE ALLOCATED ENTRIES ARE AVAILABLE FOR SEGMENTED STORES

TECHNICAL FIELD

This application claims priority to and the benefit of U.S. Patent Application Ser. No. 63/429,702, filed on Dec. 2, 2022, the entire disclosure of which is hereby incorporated by reference.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow.

Vector store instructions may be used to perform store operations on vector data. The vector store instructions may need to be broken up into multiple micro-operations for efficiency reasons. The entire instruction allocates multiple entries in a structure called the store buffer. For normal vector stores, each micro-operation allocates one entry of the store suffer. If store buffer entries are unavailable, the older micro-operations can still execute while the younger micro-operations wait for store buffer entries to become available.

Segmented vector store instructions (comprising, including, or instructing to execute segmented vector store micro-operations) may be used in vector processing to handle, in one example, storage of large vector data. In a segmented vector store, the large vector data may be divided into multiple smaller segments and stored to memory in multiple separate store operations.

With regards to store buffer entries utilization, unlike the normal vector stores, segmented stores are special because they require that all of the store buffer entries required by all micro-operations of the same vector store instruction are available before any of the micro-operations can start executing. For example, vector store instruction may allocate or instruct to allocate multiple store buffer entries, and each micro-operation (uop) may write to all of the allocated store buffer entries.

Accordingly, described are methods to stall all of the micro-operations until all of the store buffer entries are available.

Figure 1:
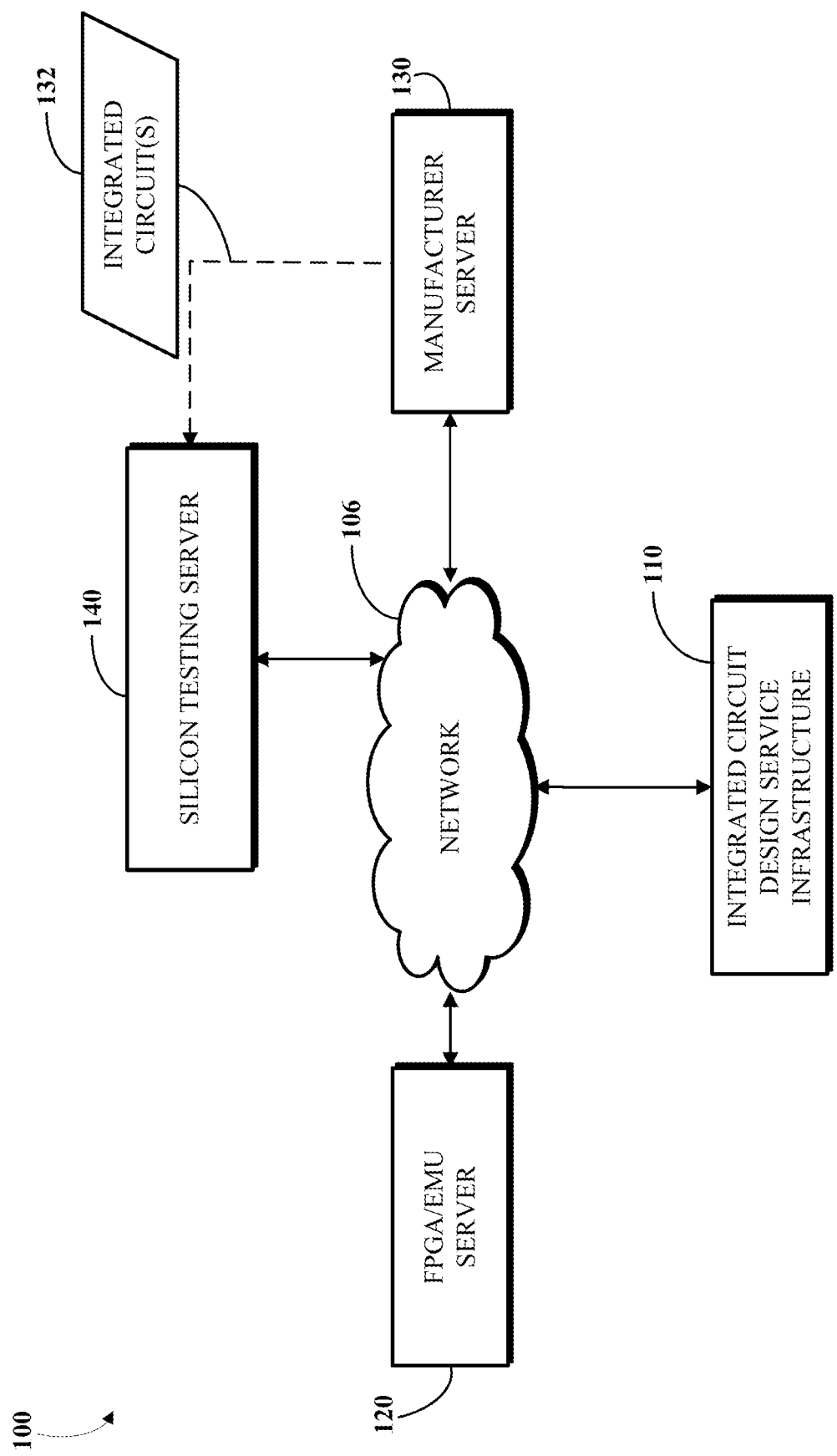
FIG. 1 is a block diagram of an example of a system for facilitating generation and manufacture of integrated circuits.

To describe some implementations in greater detail, reference is first made to examples of hardware and software structures used to implement a system including components that may perform vector store operations. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIG. 3.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
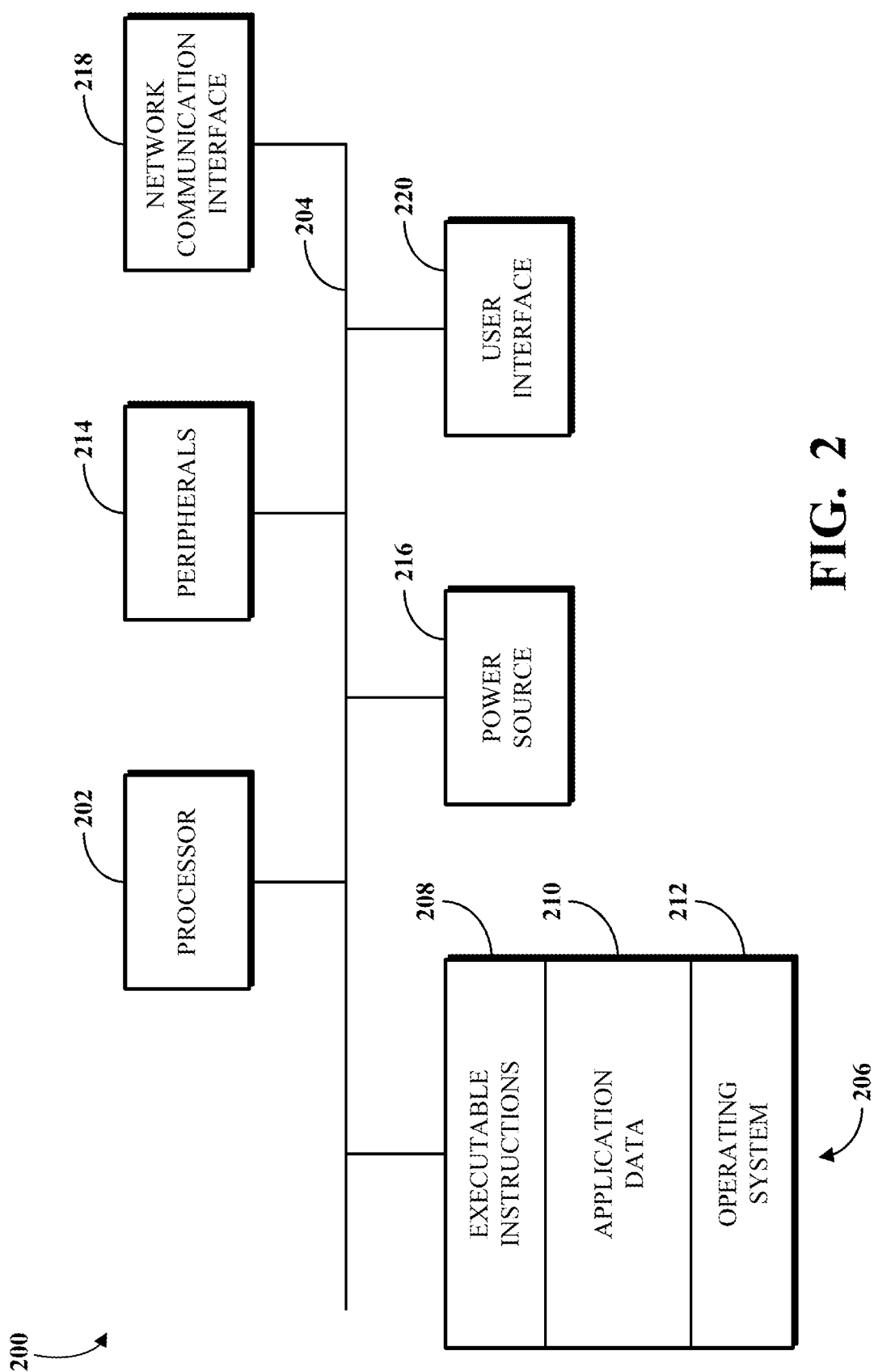
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIG. 3.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
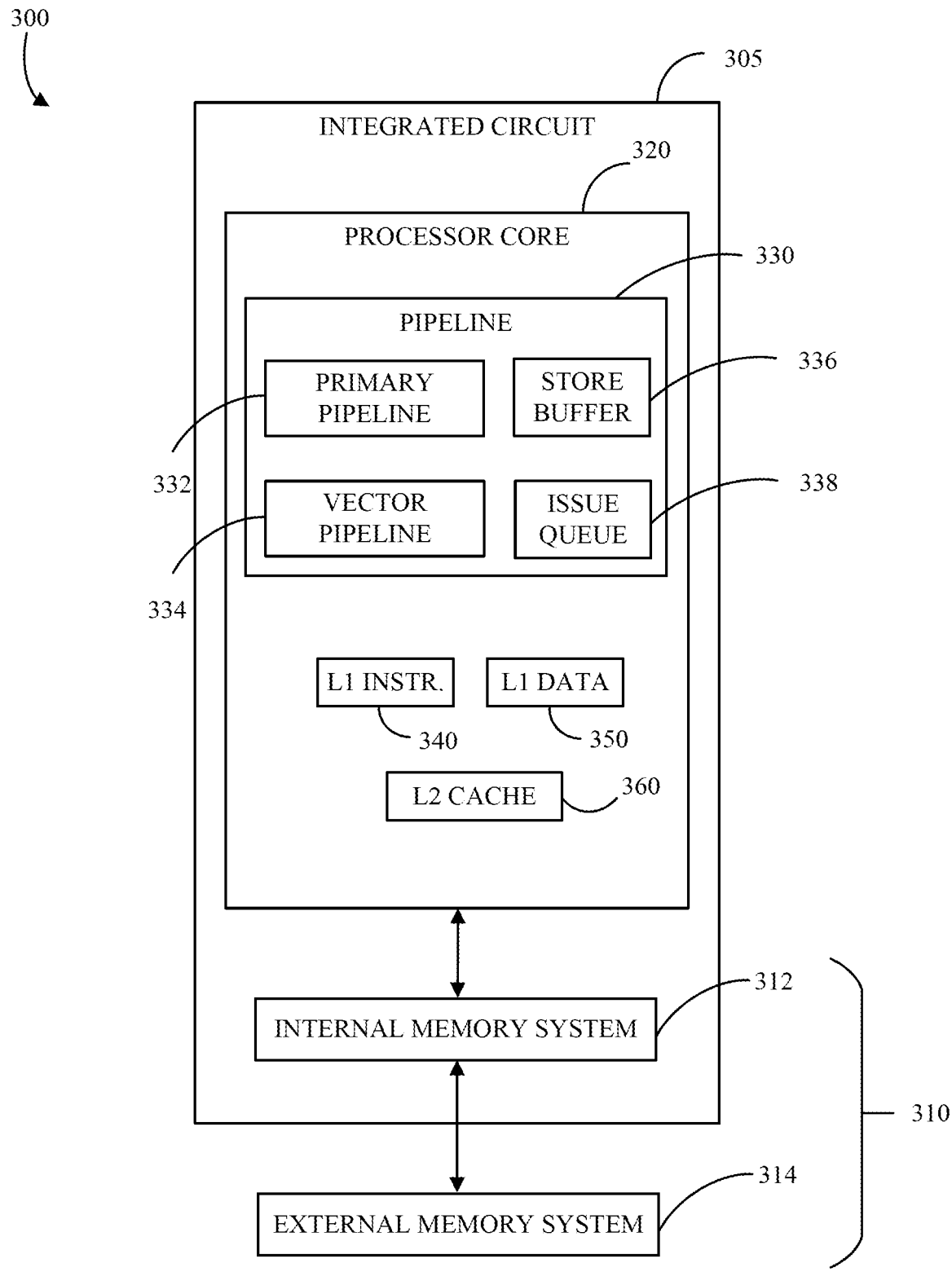
FIG. 3 is a block diagram of an example of an integrated circuit with a primary pipeline and a vector pipeline.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360.

Each of the one or more pipelines 330 may include a primary pipeline 332, a vector pipeline 334, a store buffer 336, and an issue queue 338. The primary pipeline 332 and the vector pipeline 334 each have separate decode units, rename units, dispatch units, execution units, physical and/or virtual registers, caches, queues, data paths, and/or other logic associated with instruction flow.

In some implementations, the primary pipeline 332 and the vector pipeline 334 may be out-of-order pipelines. The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

The issue queue 338 may be a buffer that holds a number of instruction requests waiting to be executed or dispatched. For example, when the processor receives a request to execute an instruction, it may place the instruction into the issue queue 338. For example, the issue queue 338 may be used to schedule an execution of vector instructions. On the other hand, the store buffer 336 may be used as a store structure to temporarily hold stores (e.g., write operations, holding write operations) to memory. For example, when the store instruction is executed, the processor may write the data to the store buffer instead of directly to memory. The data may then be written to the memory in a later stage, which may allow the processor to continue to execute other instructions without waiting for the store to complete. For example, the store buffer may handle temporary storage of write operations to memory.

In some implementations, the processor core 320 may further include a vector unit, which may be a hardware with set of instructions to perform efficient vector operations. The vector unit may include the pipeline, such as the one or more pipelines 330 including the primary pipeline 332, the vector pipeline 334, the store buffer 336, and the issue queue 338. As the vector unit is designed specifically for vector operations, it may provide high-performance for processing vector data in applications such as machine learning, scientific computing, and data analysis.

As such, inside the processor core 320 and/or the vector unit (not shown in Figures), there may be pipeline such as the pipeline 330, and a vector instruction within the pipeline may operate on multiple vector registers. The vector instruction may be split into multiple micro-operations (uops). The uops may be involved in many vector operations including, but not limited to, loading vector operands, executing vector addition, vector multiplication, vector store operations, and/or other operations, writing back results, updating status flags (e.g., relevant for the specific vector instruction), error operations, and etc.

Figure 4:
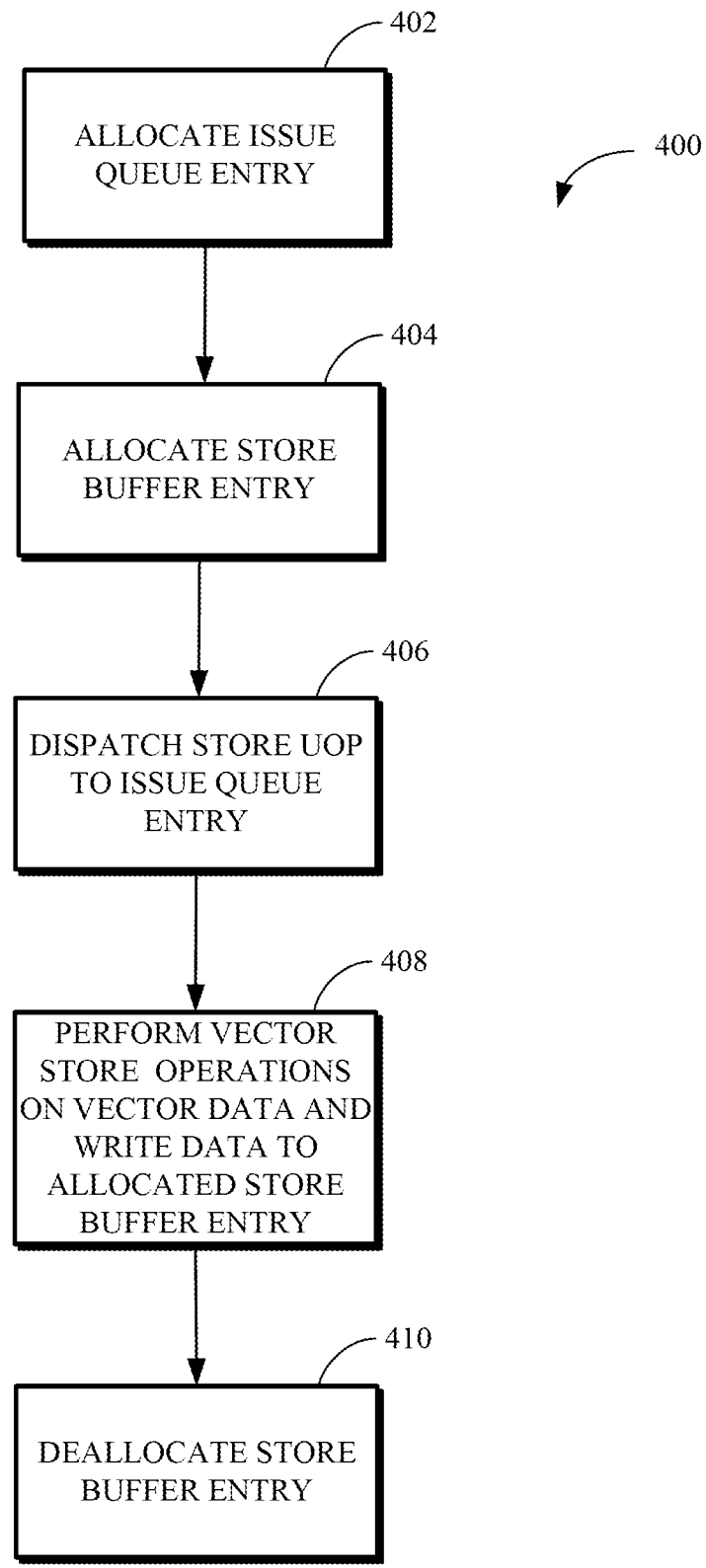
FIG. 4 is a flowchart diagram of a method of performing vector store operation.

FIG. 4 is a flowchart diagram of a method 400 of performing a vector store operation. For example, the vector store operation may be a vector store micro-operation (uop) of the micro-operations described above with respect to FIG. 3. The method 400 can be implemented, for example, by a processor, such as the processor 202, the processor core 320, and/or the vector unit. The processor may include circuitry for executing instructions, such as pipelines (e.g., the one or more pipelines 330). The processor may fetch and execute instructions in the one or more pipelines, for example, as part of a program sequence. The one or more pipelines may be implemented by various components, such as decode units, rename units, dispatch units, execution units, registers, caches, queues, data paths, and/or other logic associated with instruction flow. In some implementations, the instructions may cause memory requests (e.g., read requests and/or write requests) that the one or more pipelines may transmit to cache (e.g., L1 instruction cache 340, the L1 data cache 350, and/or the L2 cache 360). Multiple processors, memories, or both, may be used.

At 402, after decoding the vector store uop or the vector store instruction that includes the vector store uop in the one or more pipelines (e.g., the one or more pipelines 330), the method 400 (or the vector store uop) allocates an entry in an issue queue (e.g., the issue queue 338). In some implementations, the issue queue may be a buffer that holds a number of instruction requests waiting to be executed or dispatched. For example, when the processor receives a request to execute an instruction, it may place the instruction into the issue queue.

At 404, the method 400 (or the vector store uop) allocates an entry in a store buffer. In some implementations, the store buffer 336 may be used to temporarily hold stores (e.g., write operations, holding write operations) to memory. For example, when the vector store instruction or instruction including the vector store uop is executed, the processor may write the data to the store buffer instead of directly to memory or to data cache. For example, allocated store buffer entry may hold such data (and/or written data to the store buffer) until it can be written out to the memory or to the data cache.

In some implementations, for normal vector stores, each uop (micro-operation) may allocate one entry in the store buffer. If store buffer entries are unavailable, the older micro-operations can still execute while the younger micro-operations wait for store buffer entries to become available. On the other hand, segmented stores require all of the store buffer entries required by all micro-operations of the same vector store instruction are available before any of the micro-operations can start executing. For example, vector store instruction may allocate or instruct to allocate multiple store buffer entries, and each uop may write to all of the allocated store buffer entries. Detailed description of a method of vector store micro-operations implementing segmented stores may be found in the discussion of FIGS. 5 and 6.

At 406, the method 400 may dispatch the vector store uop to the allocated issue queue entry. For example, the processor may dispatch the vector store uop of the vector store instruction to the allocated issue queue entry. The dispatched vector store uop may wait for vector data to be available.

At 408, the method 400 may perform vector store operations on the vector data. For example, the vector store uop may issue down the pipeline to read the vector data (e.g., vector register, vector register data, etc.), manipulate the vector data, and write the vector data or the manipulated vector data to the allocated store buffer entry. Moreover, after issuing, the issue queue entry allocated by the vector store uop may be deallocated.

At 410, the method 400 may deallocate allocated store buffer entry. For example, after the vector store uop or the vector store instruction that includes the vector store uop finishes executing and retires from the pipeline, the store buffer entry may be deallocated.

For other types of stores, like segmented stores, single store instruction may allocate multiple Store Buffer entries, and each uop of such instruction may write to all of the allocated Store Buffer entries.

Figure 5:
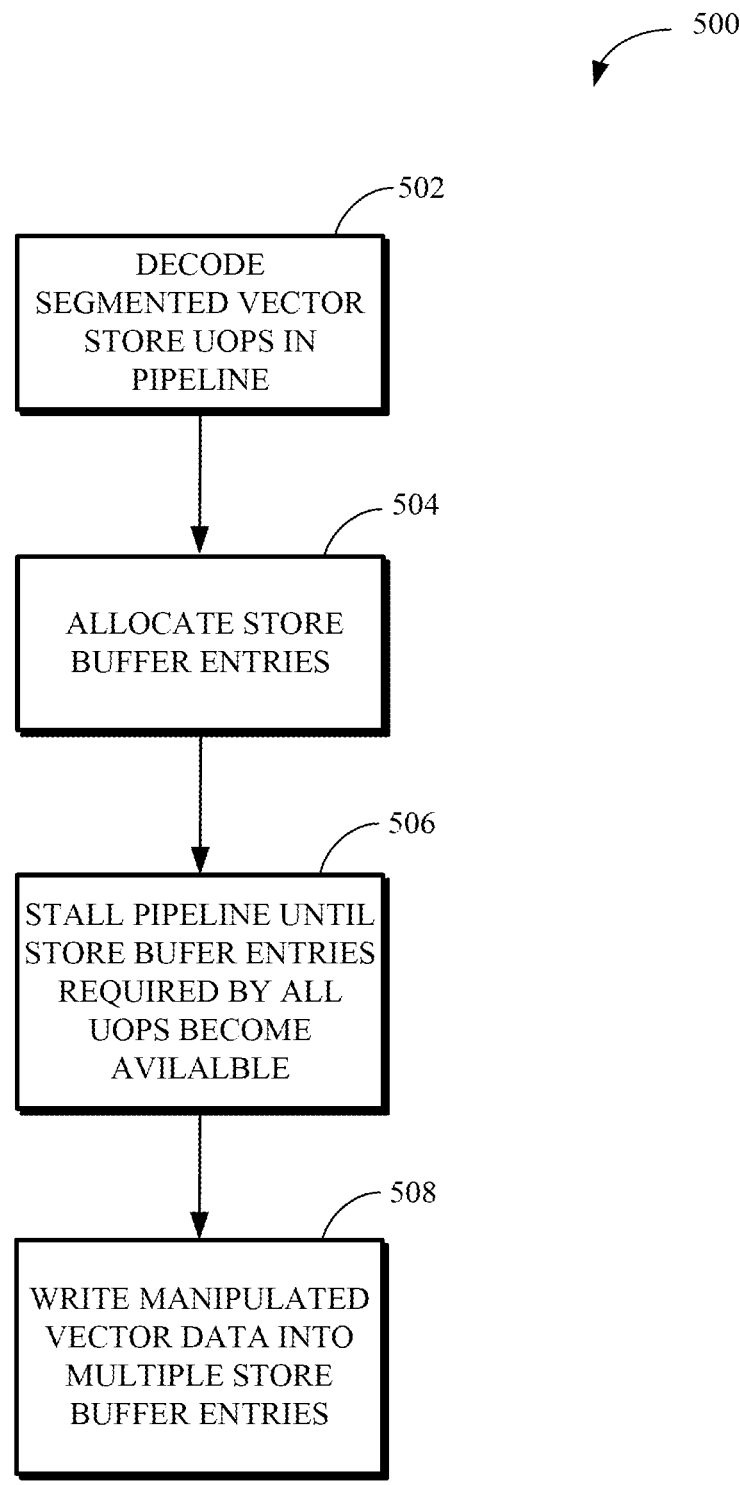
FIG. 5 is a flowchart diagram of a method of performing segmented vector store operation.

FIG. 5 is a flowchart diagram of a method 500 of performing segmented vector store operation. For example, the segmented vector store operation may be a segmented vector store micro-operation (uop). The method 500 can be implemented, for example, by a processor, such as the processor 202, the processor core 320, and/or the vector unit. The processor may include circuitry for executing instructions, such as pipelines (e.g., the one or more pipelines 330). The processor may fetch and execute instructions in the one or more pipelines, for example, as part of a program sequence. The one or more pipelines may be implemented by various components, such as decode units, rename units, dispatch units, execution units, registers, caches, queues, data paths, and/or other logic associated with instruction flow. In some implementations, the instructions may cause memory requests (e.g., read requests and/or write requests) that the one or more pipelines may transmit to cache (e.g., L1 instruction cache 340, the L1 data cache 350, and/or the L2 cache 360). Multiple processors, memories, or both, may be used. Moreover, the method 500 may be combined with the method 400 to enhance the efficiency of operation, reduce stalls at decode in pipelines, allow more instructions to enter the pipeline, and/or to satisfy any other appropriate reasons in accordance with implementations of this disclosure.

At 502, the method 500 decodes one or more segmented vector store instructions in the one or more pipelines (e.g., the one or more pipelines 330). The term "segmented vector store instruction" may be used interchangeably with "vector store instruction" for discussion of FIG. 5. The segmented vector store instructions (or the vector store instructions) may include instructions for segmented vector store micro-operations (uops).

Moreover, after decoding, the method 400 may allocate an entry in issue queue (e.g., the issue queue 338). In some implementations, the issue queue may be a buffer that holds number of instruction requests waiting to be executed or dispatched. For example, when the processor receives a request to execute an instruction, it may place the instruction into the issue queue.

At 504, the method 500 allocates multiple store buffer entries. For example, the segmented store instruction may allocate more than one store buffer entry. In some implementations, the store buffer 336 may be used to temporarily hold stores (e.g., write operations, holding write operations) to memory. For example, when the vector store instruction or instruction including the segmented vector store uop is executed, the processor may write the data to the store buffer instead of directly writing to memory or to data cache. For example, allocated store buffer entry may hold such data (and/or written data to the store buffer) until it can be written out to the memory or to the data cache. In the case of segmented vector store instruction, it may allocate or instruct to allocate multiple store buffer entries, and each segmented vector store uop may write to all of the store buffer entries allocated by same segmented vector store instruction.

In some implementations, multiple store buffer entries are allocated in First-in, First-out (FIFO) order. Moreover, to keep track of which store buffer entries are in use, allocation pointer and free pointer (e.g., retirement pointer) may be utilized. For example, the allocation of the store buffer entries in FIFO queue may be managed by an allocation pointer, which may point to the next entry to be allocated to the FIFO queue. In some implementations, the instructions (e.g., segmented vector store instructions) may be allocated or allocated to the FIFO queue (e.g., physical entries in the FIFO).

At 506, the method 500 may stall the one or more pipelines until store buffer entries required by all segmented vector store micro-operations of the same segmented vector store instruction become available. As described above, each segmented vector store uop may write to all of the store buffer entries allocated by the same segmented vector store instruction. To do so, each segmented vector store uop may need to wait for store buffer entries allocated by all segmented vector store uops are available. Accordingly, the method 500 may stall the one or more pipelines until store buffer entries required by all segmented vector store micro-operations become available.

In some implementations, stalling the pipeline until store buffer entries required by all segmented vector store uops of the same segmented vector store instruction are available includes stalling each segmented vector store uop before performing vector operation and until a respective store buffer entry by last vector store uop becomes available. As such, each segmented vector store uop may need to wait until the store buffer entry allocated by the last segmented vector store uop is available.

In some implementations, to stall the pipeline until store buffer entries required by all segmented vector store uops of the same segmented vector store instruction are available (or for each segmented vector store uop to wait until the store buffer entry allocation by the last segmented vector store uop), each segmented vector store uop can independently compute a virtual index of the last segmented vector store uop. For example, the virtual index of the last segmented vector store uop may be computed by adding 1) the virtual index of the store buffer entry allocated by first segmented vector store uop (of the same segmented vector store instruction); and 2) the total number of store buffer entries allocated by all segmented vector store uops (of the same segmented vector store instruction). As such, each segmented vector store uop may keep above two information in its payload for computing the virtual index of the last segmented vector store uop.

At 508, the method 500 may write vector data or manipulated vector data into multiple store buffer entries (or store buffer entries required by all segmented vector store uops of the same segmented vector store instruction).

In some implementations, the method 500 may perform segmented vector store operations on the vector data. For example, the segmented vector store uop may issue down the pipeline to read the vector data (e.g., vector register, vector register data, etc.), manipulate the vector data, and write the vector data or the manipulated vector data to multiple store buffer entries (or store buffer entries required by all segmented vector store uops of the same segmented vector store instruction).

Moreover, the method 500 may deallocate store buffer entries. In some implementations, the store buffer entries may be deallocated in FIFO order. After the segmented vector store or the vector store instruction that includes the segmented vector store uop finishes executing and retires from the pipeline, the store buffer entries may be deallocated.

In some implementations, the free pointer (e.g., retirement pointer) may be utilized to keep track of or manage status of the store buffer entries and deallocate the store buffer entries. For example, deallocation of the store buffer entries may be managed by the free pointer, which may point to the next entry to be deallocated. The free pointer may also utilize computation of the last segmented vector store uop by adding 1) the virtual index of the store buffer entry allocated by first segmented vector store uop (of the same segmented vector store instruction); and 2) the total number of store buffer entries allocated by all segmented vector store uops (of the same segmented vector store instruction). Such computation may also be used in part in the interest of keeping track of store buffer entries availabilities, managing allocation and deallocation, and satisfying any other feasible needs.

Figure 6:
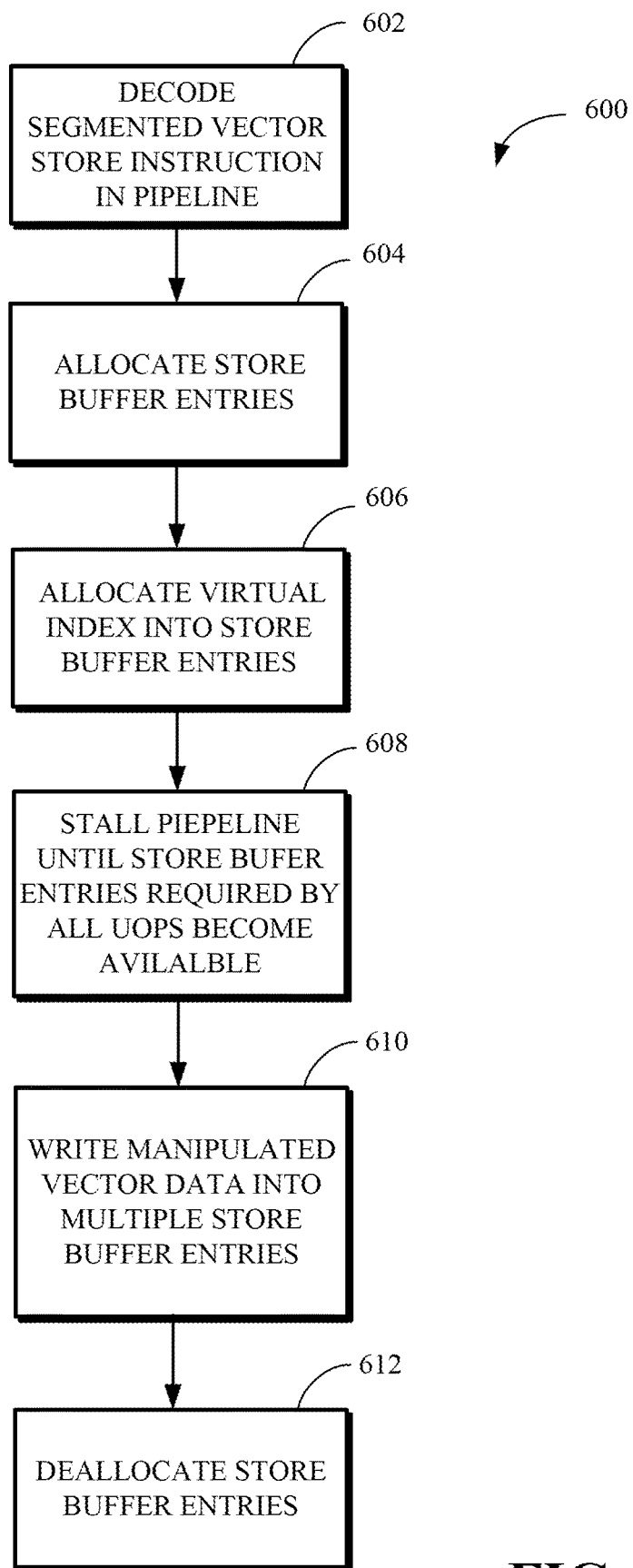
FIG. 6 is a flowchart diagram of a method 600 of performing segmented vector store operation utilizing virtual bit.

FIG. 6 is a flowchart diagram of a method 600 of performing segmented vector store operation utilizing virtual bit. For example, the segmented vector store operation may be a segmented vector store micro-operation (uop). The method 600 can be implemented, for example, by a processor, such as the processor 202, the processor core 320, and/or the vector unit. The processor may include circuitry for executing instructions, such as pipelines (e.g., the one or more pipelines 330). The processor may fetch and execute instructions in the one or more pipelines, for example, as part of a program sequence. The one or more pipelines may be implemented by various components, such as decode units, rename units, dispatch units, execution units, registers, caches, queues, data paths, and/or other logic associated with instruction flow. In some implementations, the instructions may cause memory requests (e.g., read requests and/or write requests) that the one or more pipelines may transmit to cache (e.g., L1 instruction cache 340, the L1 data cache 350, and/or the L2 cache 360). Multiple processors, memories, or both, may be used. Moreover, the method 600 may be combined with the method 400 and the method 500 to enhance the efficiency of operation, reduce stalls at decode in pipelines, allow more instructions to enter the pipeline, and/or to satisfy any other appropriate reasons in accordance with implementations of this disclosure. The term "segmented vector store instruction" may be interchangeably with "vector store instruction" for discussion of FIG. 6.

At 602, the method 600 decodes one or more segmented vector store instructions in the one or more pipelines (e.g., the one or more pipelines 330). The technique used at 602 can be the same as described with regards to step 502 of the method 500, so the technique is not repeatedly mentioned here.

At 604, the method 600 allocates multiple store buffer entries for one or more segmented vector store instructions in the one or more pipelines (e.g., the one or more pipelines 330). For example, the segmented vector store instruction allocates multiple store buffer entries. For example, the segmented store instruction allocates more than one store buffer entries to store buffer. The technique used at 604 can be the same as described with regards to step 504 of the method 500, so the technique is not repeatedly mentioned here.

At 606, the method 600 allocates (or utilizes) virtual index into the allocated store buffer entries. The allocated store buffer entries may correspond to physical entries, which may correspond to the number of entries implemented in hardware. For example, there may be 8 physical entries with physical index from 0 to 7, and segmented vector store instruction may be allocated to or allocated multiple physical entries. Further, when one or more virtual bits (e.g., extra index bit, extra color bit, color bit, color) are allocated or indexed to the physical entries, there may be resulting virtual entries with virtual index for corresponding store buffer entries (or physical entries). The number of virtual entries can be defined by number of virtual bits (e.g., extra index bit, extra color bit, color bit, color) that are allocated to the store buffer entries.

In some implementations, based on number of virtual bits allocated to the store buffer entries (or physical entries), one or more virtual entries may be assigned or mapped to one store buffer entry (or physical entry) of the store buffer entries. For example, assuming that there are 8 store buffer entries (or physical entries) with physical index 0, 1, 2, 3, 4, 5, 6, and 7, and that 3 index bits are required to map to the physical index, with 1 virtual bit (e.g., 1 extra color bit), 16 virtual entries (with virtual index from 0 to 15) may map into the 8 store buffer entries (or physical entries) with physical index from 0 to 7. In such case, virtual index 0 and 8 can map to the physical index 0, virtual index 1 and 9 can map to the physical index 1, virtual index 2 and 10 can map to the physical index 2, virtual index 3 and 11 can map to the physical index 3, virtual index 4 and 12 can map to the physical index 4, the virtual index 5 and 13 can map to the physical index 5, the virtual index 6 and 14 can map to the physical index 6, and the virtual index 7 and 15 can map to the physical index 7. When there are 2 extra color bits, 32 virtual entries may map into the 8 physical entries. For example, the virtual index 0, 8, 16, and 24 can map into the physical index 0, the virtual index 1, 9, 17, and 25 can map into the physical index 1, and so forth. Even though examples are shown with only 1 and 2 virtual bits (e.g., extra color bits), there may be more than 2 virtual bits allocated to the store buffer entries (or the physical entries).

By assigning or mapping more than one virtual entries (and thus virtual index) to one or more physical entries, one or more instructions may be allocated to or allocated the virtual entries. For example, multiple instructions in the pipeline may map into same one physical entry. As such, in the example with 8 physical entries and 16 virtual entries, instead of stalling decode after 8 instructions have decoded (but not yet retired from the pipeline), stalling can happen after 16 instructions have decoded. That is, virtual indexing may reduce the number of stalls seen at decode and may allow more instructions to enter the pipeline, and thus enhance overall performance.

In some implementations, the allocation of the instruction and/or the allocation of the store buffer entries may be managed by an allocation pointer, which may point to the next entry to be allocated (e.g., to the store buffer, to the FIFO queue). Moreover, deallocation of the instruction or deallocation of the store buffer entries may be managed by a free pointer (e.g., retirement pointer) to point to the next entry or instruction to be retired. The term "free pointer" may be used interchangeably with the term "retirement pointer."

In some implementations, determining which virtual bit index number (e.g., virtual bit 1 or virtual bit 2 of the virtual bits, color bit 1 or color bit 2 of the color bits) can use or be allocated to the given physical index X of the physical entry may include employing a method of splitting the retirement pointer into a physical index and virtual bit index. For example, if the retirement pointer's virtual index number (e.g., FIFO virtual index number) is less than or equal to the physical index number X, then the retirement pointer's current virtual bit number may use the given physical index X. Next, if the retirement pointer's virtual FIFO index number is greater than X, then a virtual bit index number may be increased in an increment of 1 from the current retirement's pointer's virtual bit index number to determine which virtual bit index may use, mapped to, or allocated to the physical index number X.

Accordingly, for a given instruction (and/or store buffers required by the instruction) and its allocated virtual index, at least some conditions where the instruction has to stall due to unavailability of required store buffer entry (or physical entry) can be determined. Given the retirement pointer's physical index (denoted as RPI) and color (denoted as RC), and the instruction's allocated physical index (denoted as SPI) and color (denoted as SC), the instruction is allowed to use its physical entry if:

$$(RC=SC) \text{ and } (SPI>=RPI) \text{ OR} \qquad \text{Equation (1)}$$

$$(SC=RC+1) \text{ and } (SPI<RPI) \qquad \text{Equation (2)}$$

As an example, assuming that 16 instructions have been decoded, virtual index 0-15 have been allocated, and no instruction has been issued yet, the retirement pointer will be 0, meaning the virtual bit index number (or color bit number) is also 0. This implies that the instruction with virtual index 0 is allowed to use physical index 0. Once the instruction with virtual index 0 executes and retires, the retirement pointer will be incremented to 1. This implies that the instruction with virtual bit index (e.g., color bit number) 1 and corresponding virtual index 8 can use the physical index 0, and become unstalled.

At 608, the method 600 may stall the one or more pipelines until store buffer entries required by all segmented vector store micro-operations of the same segmented vector store instruction become available. The technique used at 608 can be the same as described with regards to step 506 of the method 500, so the technique is not repeatedly mentioned here.

At 610, the method 600 may write vector data or manipulated vector data into multiple store buffer entries (or store buffer entries required by all segmented vector store uops of the same segmented vector store instruction). The technique used at 610 can be the same as described with regards to step 508 of the method 500, so the technique is not repeatedly mentioned here.

At 612, the method 600 may deallocate store buffer entries. In some implementations, the store buffer entries may be deallocated in FIFO order. After the segmented vector store or the vector store instruction that includes the segmented vector store uop finishes executing and retires from the pipeline, the store buffer entries may be deallocated.

In some implementations, as described above, the free pointer (e.g., retirement pointer) may be utilized to keep track of or manage status of the store buffer entries and deallocate the store buffer entries. For example, deallocation of the store buffer entries may be managed by the retirement pointer, which may point to the next entry to be deallocated.

The retirement pointer may also utilize computation of the last segmented vector store uop by adding 1) the virtual index of the store buffer entry allocated by first segmented vector store uop (of the same segmented vector store instruction); and 2) the total number of store buffer entries allocated by all segmented vector store uops (of the same segmented vector store instruction). Such computation may also be used in part in the interest of keeping track of store buffer entries availabilities, managing allocation and deallocation, and satisfying any other feasible needs.

The described methods and systems include a method for stalling issue queue entries until consecutive allocated entries are available for segmented stores. The method includes decoding one or more segmented vector store micro-operations (uops) of segmented vector store instruction in a pipeline; allocating, based on each of the one or more segmented vector store uops, one or more respective store buffer entries in first-in, first-out (FIFO) order; stalling the pipeline until store buffer entries are allocated for all of the one or more segmented vector store uops of the segmented vector store instruction; and writing, based on each of the one or more segmented vector store uops, manipulated vector data into allocated store buffer entries. In implementations, the method can further include allocating, using a virtual bit, a virtual index to the store buffer entries.

In implementations, the stalling can include stalling each segmented vector uop before performing a vector operation and until a respective store buffer entry for a last vector store uop becomes available. In implementations, each of the segmented vector store uops has a payload that includes a respective virtual index of a respective store buffer entry allocated for a first segmented vector store uop of the segmented vector store instruction, and a total number of store buffer entries allocated for all of the segmented vector store uops. In implementations, stalling each segmented vector uop before performing the vector operation and until a respective store buffer entry for the last vector store uop becomes available can include determining the respective virtual index of the last segmented vector store uop based on the respective virtual index of the first segmented vector store uop and the total number of the store buffer entries allocated.

In implementations, the allocating can be managed by an allocation pointer that points to a next store buffer entry to be allocated. In implementations, the deallocating is managed by a retirement pointer to point to a next store buffer entry to be retired or deallocated. In implementations, the store buffer entries cam be deallocated in a program order.

The described methods and systems include a non-transitory computer readable medium that includes a circuit representation that can be used to program or manufacture an integrated circuit for stalling issue queue entries until consecutive allocated entries are available for segmented stores. The integrated circuit includes a processor that includes a circuitry that decodes one or more segmented vector store micro-operations (uops) of segmented vector store instruction in a pipeline; allocates, based on each of the one or more segmented vector store uops, one or more respective store buffer entries in first-in, first-out (FIFO) order; stalls the pipeline until store buffer entries are allocated for all of the one or more segmented vector store uops of the segmented vector store instruction; and write, based on each of the one or more segmented vector store uops, manipulated vector data into allocated store buffer entries.

The described methods and systems include an integrated circuit for stalling issue queue entries until consecutive allocated entries are available for segmented stores. The integrated circuit includes a store buffer and a processor. The processor is configured to decode one or more segmented vector store micro-operations (uops) of segmented vector store instruction in a pipeline; allocate, based on each of the one or more segmented vector store uops, one or more respective store buffer entries in first-in, first-out (FIFO) order; stall the pipeline until store buffer entries are allocated for all of the one or more segmented vector store uops of the segmented vector store instruction; and write, based on each of the one or more segmented vector store uops, manipulated vector data into allocated store buffer entries.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:
   decoding one or more segmented vector store micro-operations (uops) of segmented vector store instruction in a pipeline;
   allocating, based on each of the one or more segmented vector store uops, one or more respective store buffer entries in first-in, first-out (FIFO) order;
   stalling the pipeline until store buffer entries are allocated for all of the one or more segmented vector store uops of the segmented vector store instruction;
   writing, based on each of the one or more segmented vector store uops, manipulated vector data into allocated store buffer entries; and
   allocating, using a virtual bit, a virtual index to the store buffer entries.

2. The method of claim 1, wherein stalling the pipeline until store buffer entries are allocated to all of the one or more segmented vector store uops includes:
   stalling each segmented vector store uop before performing vector operation and until a respective store buffer entry for a last vector store uop becomes available.

3. The method of claim 2, wherein each of the segmented vector store uops has a payload that includes a respective virtual index of a respective store buffer entry allocated for a first segmented vector store uop of the segmented vector store instruction, and a total number of store buffer entries allocated for all of the segmented vector store uops.

4. The method of claim 3, wherein stalling the pipeline until store buffer entries are allocated for all of the one or more segmented vector store uops further includes:
   determining the respective virtual index of the last segmented vector store uop based on the respective virtual index of the first segmented vector store uop and the total number of the store buffer entries allocated.

5. The method of claim 4, wherein allocating one or more respective store buffer entries in first-in, first-out (FIFO) order is managed by an allocation pointer that points to a next store buffer entry to be allocated.

6. The method of claim 5, further comprising:
   deallocating, after the one or more segmented vector store uops retire from the pipeline, respective store buffer entries.

7. The method of claim 5, further comprising:
   deallocating, after all segmented vector store uops retire from the pipeline, the store buffer entries.

8. The method of claim 6, wherein the store buffer entries are deallocated in a program order.

9. The method of claim 8, wherein deallocating is managed by a retirement pointer to point to a next register entry to be retired.

10. A non-transitory computer readable medium comprising a circuit representation that, when processed by a computer, is used to program or manufacture an integrated circuit comprising:
    a processor including circuitry that:
        decodes one or more segmented vector store micro-operations (uops) of segmented vector store instruction in a pipeline;
        allocates, based on each of the one or more segmented vector store uops, one or more respective store buffer entries in a first-in, first-out (FIFO) order;
        stalls the pipeline until store buffer entries are allocated for all of the one or more segmented vector store uops of the segmented vector store instruction;
        writes, based on each of the one or more segmented vector store uops, manipulated vector data into allocated store buffer entries; and
        allocate, using a virtual bit, a virtual index to the store buffer entries.

11. The non-transitory computer readable medium of claim 10, wherein
stalling the pipeline until the store buffer entries are allocated for all of the segmented vector store uops includes:
    stalling each segmented vector store uop before performing a vector operation and until a respective store buffer entry for a last segmented vector store uop becomes available.

12. The non-transitory computer readable medium of claim 11, wherein each of the segmented vector store uops has a payload that includes a respective virtual index of respective store buffer entry allocated for a first segmented vector store uop of the segmented vector store instruction, and a total number of store buffer entries allocated for all of the segmented vector store uops.

13. The non-transitory computer readable medium of claim 12, wherein stalling the pipeline until store buffer entries are allocated for all of segmented vector store uops includes:
    determining the respective virtual index of the last segmented vector store uop based on the respective virtual index of the first segmented vector store uop and the total number of the store buffer entries allocated.

14. An integrated circuit comprising:
    a store buffer; and
    a processor configured to:
        decode one or more segmented vector store micro-operations (uops) of segmented vector store instruction in a pipeline;
        allocate, based on each of the one or more segmented vector store uops, respective store buffer entries in the store buffer in first-in, first out (FIFO) order;
        stall the pipeline until store buffer entries are allocated for all of the one or more segmented vector store uops of the segmented vector store instruction;
        write, based on each of the one or more segmented vector store uops, manipulated vector data into allocated store buffer entries; and
        allocate, using a virtual bit, a virtual index to the store buffer entries.

15. The integrated circuit of claim 14, wherein to stall the pipeline until the store buffer entries are allocated for all of the one or more segmented vector store uops includes:

stall each segmented vector store uop before performing a vector operation and until a respective store buffer entry for a last vector store uop becomes available.

16. The integrated circuit of claim 15, wherein each of the segmented vector store uops has a payload that includes a respective virtual index of respective store buffer entry allocated for a first segmented vector store uop of the segmented vector store instruction, and a total number of store buffer entries allocated by all of the segmented vector store uops.

17. The integrated circuit of claim 16, wherein to stall the pipeline until the store buffer entries are allocated for all of the one or more segmented vector store uops further includes:

determine the respective virtual index of the last segmented vector store uop based on the respective virtual index of the first segmented vector store uop and the total number of the store buffer entries allocated.

* * * * *